United States Patent
Blainey et al.

(10) Patent No.: US 7,318,223 B2
(45) Date of Patent: Jan. 8, 2008

(54) METHOD AND APPARATUS FOR A GENERIC LANGUAGE INTERFACE TO APPLY LOOP OPTIMIZATION TRANSFORMATIONS

(75) Inventors: Robert James Blainey, Chandlers Ford (GB); Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/926,601

(22) Filed: Aug. 26, 2004

(65) Prior Publication Data

US 2006/0048121 A1    Mar. 2, 2006

(51) Int. Cl.
G06F 9/45    (2006.01)
(52) U.S. Cl. .................................... 717/160
(58) Field of Classification Search ........ 717/114–119, 717/140, 150–154, 159, 160; 711/113, 118–132
See application file for complete search history.

(56) References Cited

U.S. PATENT DOCUMENTS

| | | | | |
|---|---|---|---|---|
| 5,230,053 | A | | 7/1993 | Zaiki ............................ 395/700 |
| 5,303,357 | A | * | 4/1994 | Inoue et al. ................. 717/160 |
| 5,535,393 | A | * | 7/1996 | Reeve et al. ................. 717/149 |
| 5,953,531 | A | * | 9/1999 | Megiddo et al. ............. 717/160 |
| 6,038,398 | A | * | 3/2000 | Schooler ...................... 717/160 |
| 6,226,790 | B1 | * | 5/2001 | Wolf et al. ................... 717/135 |
| 6,567,976 | B1 | | 5/2003 | Wolf ............................ 717/160 |
| 7,086,039 | B2 | * | 8/2006 | Lam ............................. 717/136 |
| 2003/0110481 | A1 | * | 6/2003 | Wada et al. .................. 717/158 |
| 2005/0144605 | A1 | * | 6/2005 | Motokawa et al. .......... 717/160 |

OTHER PUBLICATIONS

Steve Carr and Ken Kennedy, "Compiler Blockablility of Numerical Algorithms", 1992, Proceedings of the 1992 ACM/IEEE Conference on Supercomputing, pp. 114-124.*
Stephanie Coleman and Kathryn McKinley, "Tile Size Selection Using Cache Organization and Data Layout", 1995, Proceedings of the ACM SIGPLAN 1995 Conference on Programming Language Design and Implementation, pp. 279-289.*
James Gosling, Bill Joy, and Guy Steele, "The Java™ Language Specification", 1996, pp. 271-272, 286.*
Hewlett Packard, "Exemplar Programming Guide for HP-UX Systems", Dec. 1997, First Edition, pp. xix, 39-40, 83-91.*
Steven Muchnick, "Advanced Compiler Design Implementation", 1997, Academic Press, pp. 695-698.*
Apan Qasem, Guohua Jin, and John Mellor-Crummey, "Improving Performance with Integrated Program Transformations", Oct. 2003, Technical Report TR03-419, Rice University, pp. 1-13.*

(Continued)

*Primary Examiner*—Thomas Lee
*Assistant Examiner*—Jue Wang
(74) *Attorney, Agent, or Firm*—Duke W. Yee; Mark S. Walker; Wayne P. Bailey

(57) ABSTRACT

A generic language interface is provided to apply a number of loop optimization transformations. The language interface includes two new directives. The present invention detects the directives in a computer program, and generates code that has been applied at least one loop transformation based on the directives.

31 Claims, 6 Drawing Sheets

OTHER PUBLICATIONS

Qing Yi, Vikram Adve, Ken Kennedy, "Transforming Loops to Recursion for Multi-Level Memory Hierarchies", 2000, Conference on Programming Language Design and Implementation, pp. 169-181.*

"The Paramount Group FAQ", Jun. 4, 2003, section "Ploaris internal directives", retrieved from: http://cobweb.ecn.purdue.edu/ParaMount/FAQ/.*

"MIPSpro C/C++ Pragmas", Aug. 15, 2003, Chapter 8, retrieved from: http://techpubs.sgi.com/library/tpl/cgi-bin/getdoc.cgi/0650/bks/SGI_Developer/books/Pragmas/sgi_html/ch08.html.*

IBM, "XL Fortran Enterprise Edition for AIX, Language Reference, Version 9.1", Aug. 2004, First Edition, pp. 434-435, 445-446.*

Lieuwen et al., "A Transformation-Based Approach to Optimizing Loops in Database Programming Languages", ACM Digital Library 1992, pp. 91-100.

Chelcea et al., "Resynthesis and Peephole Transformations for the Optimization of Large-Scale Asynchronous Systems", ACM Digital Library 2002, pp. 405-410.

Raghavachari et al., "Ace: A Language for Parallel Programming with Customizable Protocols", ACM Transactions on Computer Systems, vol. 17, No. 3, Aug. 1999, pp. 202-248.

Whitfield et al., "An Approach for Exploring Code-Improving Transformations", ACM Transactions on Programming Languages and Systems, vol. 19, No. 6, Nov. 1997, pp. 1053-1084.

* cited by examiner

```
                    BEFORE LOOP TILING
         ⎧  do i = 1, N1
         ⎪  ⎧  do j = 1, N2
    702 ⎨ 704 ⎨   X(i, j) = Y(j, i) + Y(j + 1, i)
         ⎪  ⎩  end do
         ⎩  end do
                    AFTER LOOP TILING
           do ii = 1, N1, Bi
             do jj = 1, N2, Bj
           ⎧   do i = ii, min (ii + Bi - 1, N1)
           ⎪   ⎧ do j = jj, min (jj + Bj - 1, N2)
       708 ⎨712 ⎨   X(i, j) = Y(j, i) + Y(j + 1, i)    710   706
           ⎪   ⎩ end do
           ⎩   end do
             end do
           end do
```

```
              ⎧  do i = 1, N
              ⎪  !IBM* BLOCK_LOOP(50) ⸺ 806
              ⎪  ⎧ do j = 1, M
         802 ⎨804 ⎨   .
              ⎪  ⎪   .
              ⎪  ⎩ end do
              ⎩  end do
```

```
              ⎧  do i = 1, N
              ⎪  ⎧ do jj = 1, M, 50
              ⎪  ⎪  ⎧ do j = jj, min(jj + 49, M)
         802 ⎨812 ⎨814 ⎨  .
              ⎪  ⎪  ⎪   .
              ⎪  ⎪  ⎩ end do
              ⎪  ⎩ end do
              ⎩  end do
```

FIG. 12A

```
                    1204      1205
                     /         /
    !IBM* BLOCK_LOOP(L3Factor, first_level_blocking) ⌐1202
         do i = 1, N
    !IBM* LOOPID(first_level_blocking) ⌐1206
              1218⌒              ⌒1220
    !IBM* BLOCK_LOOP(L2Factor, inner_space) ⌐1208
         do j = 1, N
    !IBM* LOOPID(inner_space) ⌐1212
                   do k = 1, M
                        do L = 1, M
              1214  1216       ⋮        1210
                        end do
                   end do
         end do
    end do
```

FIG. 12B

```
    !IBM* BLOCK_LOOP(L3Factor, first_level_blocking) ⌐1202
         do i = 1, N
    !IBM* LOOPID(first_level_blocking) ⌐1206
              do kk = 1, M, L2Factor
                   do j = 1, N
                        do k = kk, min (kk + L2Factor - 1, M)
                             do L = 1, M
    1204   1218                    ⋮                           1219
                             end do
                        end do
                   end do
              end do
         end do
```

FIG. 12C

```
    do kkk = 1, M, (L3Factor x L2Factor)
         do i = 1, N
              do kk = kkk, min (kkk + (L3Factor x L2Factor) - 1, M), L2Factor
                   do j = 1, N
                        do k = kk, min (kk + L2Factor - 1, M)
                             do L = 1, M
    1220   1224                    ⋮                           1219
                             end do
                        end do
                   end do
              end do
         end do
    end do
```

METHOD AND APPARATUS FOR A GENERIC LANGUAGE INTERFACE TO APPLY LOOP OPTIMIZATION TRANSFORMATIONS

BACKGROUND OF THE INVENTION

1. Technical Field

The present invention relates to an improved data processing system. In particular, the present invention relates to loop optimization transformations. Still particularly, the present invention relates to a generic language interface that allows programmers to apply loop optimization transformations on loops in data processing system programs.

2. Description of Related Art

In conventional computing systems, processors execute program instructions by first loading the instructions from memory, which may either be a cache memory or main memory. Main memory is a storage device used by the computer system to hold currently executing program instructions and working data. An example of main memory is random access memory (RAM).

Cache memory is a fast memory that holds recently accessed data, designed to speed up subsequent access to the same data. When data are read from or written to the main memory, the cache memory saves a copy along with associated main memory address. The cache memory also monitors addresses of subsequent reads to see if requested data is already stored in the cache. If it is, a cache hit occurs and the data is returned immediately. Otherwise, a cache miss occurs and the data is fetched from main memory and saved in the cache.

Since the cache memory is built from faster memory chips than the main memory, a cache hit generally takes less time to complete than a main memory access. Therefore, multiple levels of cache memory may be implemented in a computer system to provide faster or slower access time to data. For example, level one cache is smaller in size and located closer to the processor, which provides faster access time. On the other hand, a level two cache is larger in size and provides slower access time than level one cache.

While level one cache may locate in close proximity with the processor, level two cache may be located further away from the processor. If an attempt made to access data from the level one cache fails, the processor often steps up to the level two cache or higher to access the same data. Thus, a system may have several levels of cache memory that catch lower level cache misses before attempting to access from main memory.

Cache memory relies on two properties when accessing program data: temporal locality and spatial locality. Temporal locality addresses frequency of data access. If data is accessed once, the same data is likely to be accessed again soon. Spatial locality addresses the location of data in memory. If a memory location is accessed then nearby memory locations are likely to be accessed.

To exploit spatial locality, cache memory often operates on several words at a time, which is known as a cache line or cache block. On the other hand, main memory reads and writes in terms of a number of cache lines or cache blocks. Previously, attempts have been made to reduce cache miss rate in computer systems. These attempts include utilizing larger block size, cache size, and pre-fetching instructions. However, these attempts require associated hardware changes.

In recent years, other attempts have been made using software optimizations, such that program instructions may be reordered to reduce the number of cache misses. These software optimization transformations may be done by an optimizing compiler. Examples of software optimization techniques include merging arrays, loop interchange, and blocking. Merging array improves spatial locality by using a single array of compound elements, rather than two arrays of single elements. This technique reduces potential conflicts of data elements in the cache memory when data elements are accessed for the two arrays. Loop interchange changes nesting of loops to access data in the order stored in memory, which improves spatial locality. Blocking, or "tiling", improves temporal locality by accessing cache-contained "tiles" of data repeatedly, rather than iterating a whole column or row of data.

Currently, in order to optimize the program by performing loop transformations, programmers have to modify existing program instructions to insert their own performance tuning code. Programmers may also rely on the compiler to heuristically apply the performance tuning transformations at compile-time. However, programmers may not interact with the compiler directly to tune their programs using complex loop transformations without first modifying existing program instructions, or do so in a limited way. This situation makes it difficult for programmers to control the compiler optimization process in order to apply complex loop transformations.

Therefore, it would be advantageous to have a method and apparatus that allows programmers to gain control of the compiler optimization process in order to apply complex loop transformations. Also, it would be advantageous to have a method and apparatus that allows programmers to direct the compiler to perform loop transformations without modifying existing program instructions. Furthermore, it would be advantageous to allow other compilers to apply the loop transformations or ignore them completely without changing the semantics of the existing program.

SUMMARY OF THE INVENTION

The present invention provides a method, apparatus and computer instructions for a generic language interface to apply a number of loop optimization transformations. The present invention detects at least one directive in a computer program, generates at least one loop transformation based the at least one directive, and places at least one loop transformation in the computer program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 12A is a diagram illustrating an exemplary implementation of BLOCK_LOOP and LOOPID directives for the purpose of loop tiling for multi-level memory hierarchy in accordance with a preferred embodiment of the present invention;

FIG. 12B is a diagram illustrating exemplary resulting code after BLOCK_LOOP directive 1208 in FIG. 12A is processed by the compiler is depicted in accordance with a preferred embodiment of the present invention;

FIG. 12C is a diagram illustrating exemplary resulting code after BLOCK_LOOP directive 1202 in FIG. 12B is processed by the compiler in accordance with a preferred embodiment of the present invention; and FIG. 13 is a diagram illustrating concept of fitting lower level cache memory into higher level cache memory in accordance with a preferred embodiment of the present invention.

DETAILED DESCRIPTION OF THE PREFERRED EMBODIMENT

Figure 1:
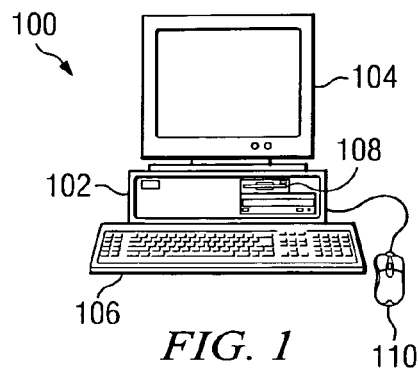
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
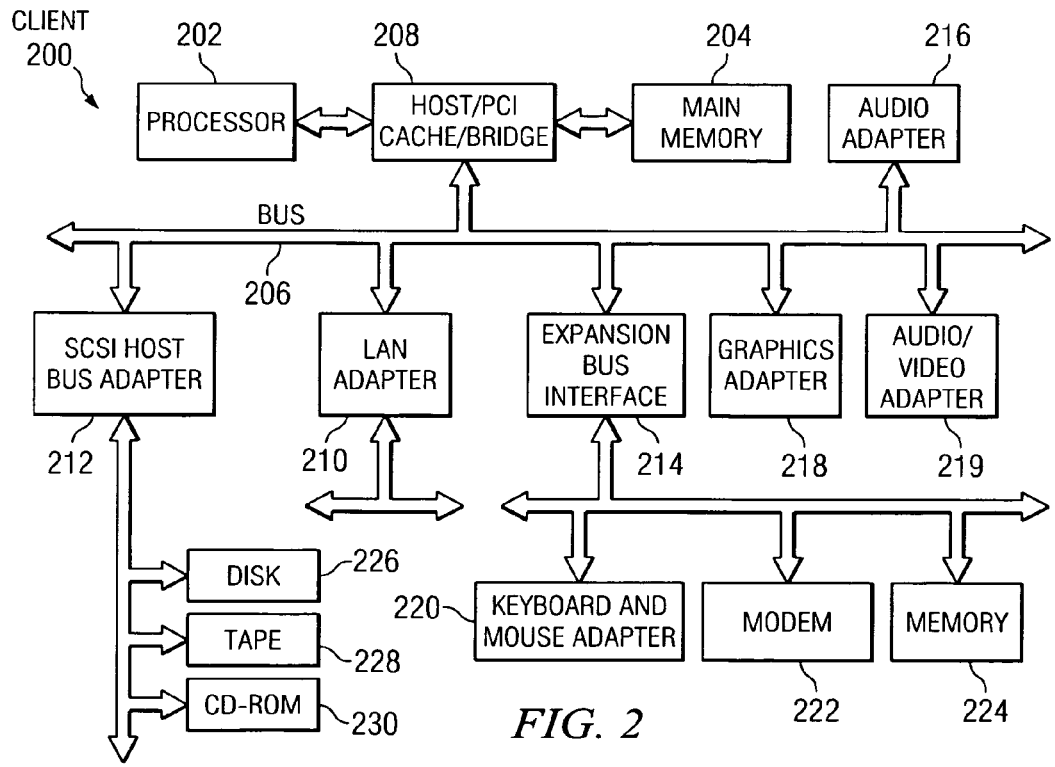
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus and computer instructions for a generic language interface to apply a number of loop optimization transformations. Examples of loop optimization transformations include loop tiling, strip mining, and loop interchange. The present invention provides a generic language interface. Programmers may use this interface to direct a compiler to perform a number of loop transformations. The generic language interface includes two new user directives: BLOCK_LOOP directive and LOOP_ID directive. A directive is a form of comment that passes specific information to the compiler. A user directive is a directive placed in the source code by a user, whom may be, for example, a programmer.

Programmers may employ user directives of the present invention to direct a compiler to apply loop optimization transformations while directing other compilers to ignore the user directives as the directives are treated as comments by other compilers. In this way, programmers may control the loop transformations process without modifying existing program instructions.

Currently, directives of the present invention may be defined in languages, such as, for example, Fortran, C, and C++. In addition, directives may be used for compilers, such as, for example, IBM XL Fortran Compiler and IBM XL C/C++ compiler, which are products available from International Business Machines Corporation. However, directives of the present invention may also be used with other languages and compilers.

In a preferred embodiment of the present invention, a BLOCK_LOOP directive is a directive that directs the compiler to create a blocking loop for a given loop in a loop nest. "Blocking" is dividing the iteration space of a loop into blocks. These blocks are also referred to as "tiles". A blocking loop is an outer loop that is created to drive the original loop for each block. When the compiler detects a BLOCK_LOOP directive, the compiler creates the blocking loop to surround the blocked loop. A user may specify one or more parameters for a BLOCK_LOOP directive. In these illustrative examples, the first parameter of the BLOCK_LOOP directive is the blocking factor. In this example, the blocking factor is the size of the block to which the iteration space is divided, such as, a block of 50×50.

Second and subsequent parameters represent the name of one or more loops to be blocked, for example, myLoop1 and myLoop2. An example BLOCK_LOOP directive using the above parameters may be BLOCK_LOOP (50, myLoop1, myLoop2). If no second or subsequent parameters are defined in the BLOCK_LOOP directive, the compiler is directed to block the loop immediately following the directive.

The LOOPID directive in the illustrative embodiments directs the compiler to assign a loop with a scope-unique loop identifier. The loop identifier may then be used with other directives, such as BLOCK_LOOP directive, to control transformations on the loop or by a reporting facility to report on transformations and other information relating to a specific loop. Thus, the LOOPID directive assigns a name for the loop.

In the depicted examples, the LOOPID directive includes one parameter, which is the name of the loop. An example LOOPID directive may be LOOPID (myLoop1). A user may place LOOPID directive immediately before the the loop to be blocked. The compiler will then recognize the loop to be blocked by marking the first statement of the loop, for example, do i=1, M, to the last statement of the loop, for example, end do.

Using the BLOCK_LOOP and LOOPID directives, the mechanism of the present invention can relate to two loops at the same time and create different behaviors by creating blocking loops at different nesting levels. In addition to blocking, these behaviors may include other loop transformations, such as, for example, loop interchange, loop tiling or strip mining. These loop transformations are discussed in detail below.

Figure 3:
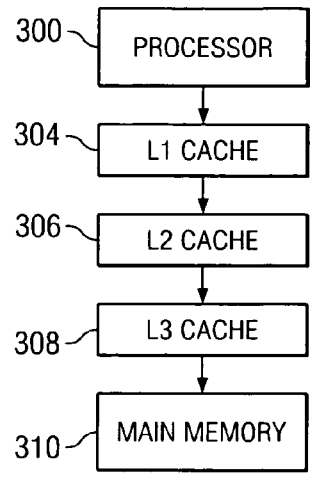
FIG. 3 is a diagram illustrating an exemplary implementation of components in accordance with the present invention.

Turning now to FIG. 3, a diagram illustrating an exemplary implementation of components 202, 204 and 208 in FIG. 2 is depicted in accordance with the present invention. As shown in FIG. 3, in this illustrative example, processor 202 and main memory 204 in FIG. 2 may be implemented as processor 300 and main memory 310 in the FIG. 3. However, PCI bridge 208 in FIG. 2 may include two or more levels of cache memory, In this example, level 1 cache 304, and level 2 cache 306 are depicted. Level 1 cache 304 may be a fast memory chip that includes a small memory size, such as 64 kilobytes. Generally, level 1 cache 304 is sometimes referred to as a "primary cache". This cache is located between the processor, such as processor 300, and level 2 cache 306. Depending on the implementation, level 1 cache 304 may be integrated on the same integrated circuit as processor 300. Level 1 cache 306 also is more expensive compared to level 2 cache 304, because of its faster access speed.

Level 2 cache 306, a secondary cache, is larger and slower than level 1 cache 304. Level 2 cache 306 generally locates between the level 1 cache 304 and main memory 310. When cache misses occur in level 1 cache 306, processor 300 may attempt to retrieve data from level 2 cache 306 prior to searching for the data in main memory 310. Unlike level 1 cache 304, level 2 cache 306 is often located external to the integrated circuit of processor 300. Level 2 cache 306 also is cheaper to produce compared to level 1 cache 304, because of its slower access speed. In addition to level 1 and level 2 caches, other levels may also be added to PCI bridge 208 in FIG. 2, for example, level 3 cache 308, which is even larger in size than level 2 cache 306 and has slower access time.

Figure 4:
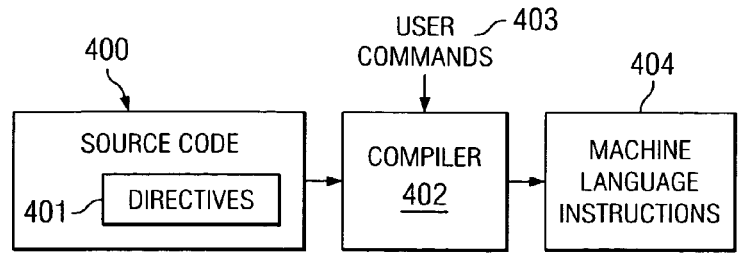
FIG. 4 is a diagram illustrating relationships between compilers and users in a preferred embodiment of the present invention.

Turning now to FIG. 4, a diagram illustrating relationships between compilers and users is depicted in a preferred embodiment of the present invention. As illustrated in FIG. 4, in this illustrative example, a user, such as a programmer, may define directives 401 in source code 400. Directives are in the form of comments. Depending on the implementation of compiler 402, directives may or may not be ignored by compiler 402. Once directives are inserted in source code 400, a user may compile source code 400 through user commands 403. User commands 403 may be a user input command with parameters.

Once compiler 402 compiles source code 400, an optimized program with loop transformations applied by the compiler is generated as a set of machine language instructions, such as machine language instructions 404. The machine language instructions may be for a specific platform, such as, a UNIX platform. A user may execute these instructions on the specific platform with reduced cache misses and, thus, faster execution times. The loop transformations, include for example, loop interchange, loop tiling, and blocking.

Figure 5:
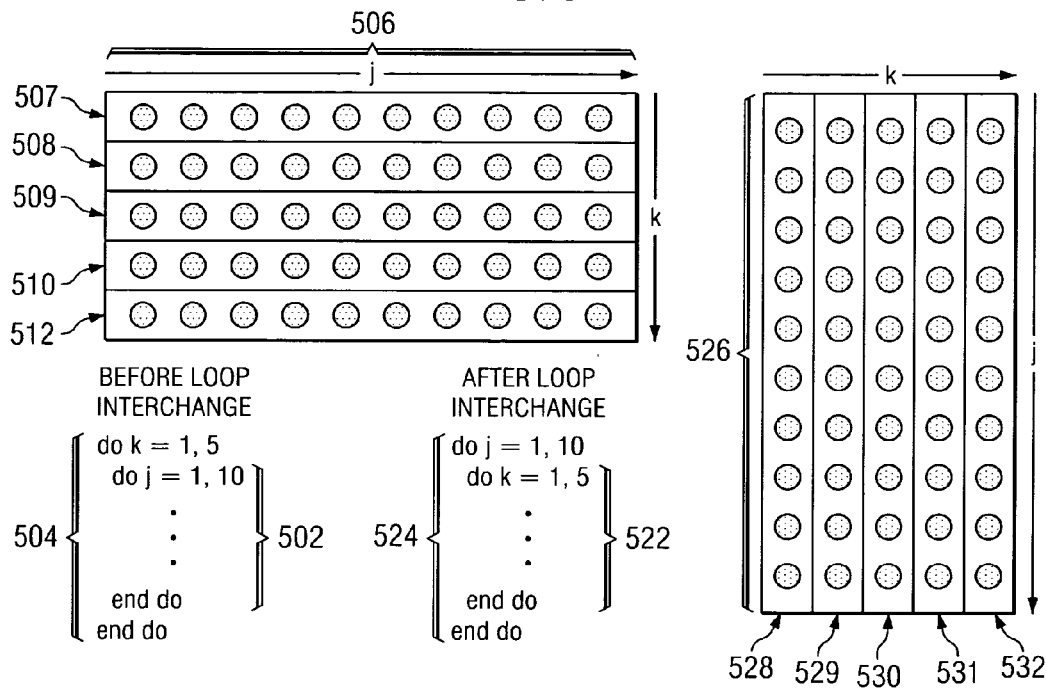
FIG. 5 is a diagram illustrating the concept of loop interchange in accordance with a preferred embodiment of the present invention.

Turning now to FIG. 5, a diagram illustrating the concept of loop interchange is depicted in accordance with a preferred embodiment of the present invention. As shown in FIG. 5, in this illustrative example two nested loops, loop 502 and loop 504 are shown. Loop 502, or j loop, is an inner loop that iterates from 1 to 10. Loop 504, or k loop, is an outer loop that iterates loop 502 from 1 to 5.

Block 506 illustrates how loop 502 and loop 504 iterate before loop interchange occurs. In this example, The j loop, loop 502, iterates for every iteration of the k loop, loop 504. Typically, the dimensions of a multi-dimensional array or ordered from the major dimension to the minor dimension. Also typically, the elements in the minor dimension are stored close to each other in memory. Hence, when an element is accessed, a number of neighboring elements are stored along with it in the cache to form a cache line. When the program accesses a multi-dimensional array in an iteration order that is different from its placement in memory, a cache miss may occur for almost every element accessed, since the elements being accessed may be sparsely distributed in memory. Loop Interchange allows changing the iteration order to be more compatible with the data's placement in memory.

As shown in FIG. 5, after loop interchange, the j loop, or loop 502, now represented by loop 524, is placed outside of the k loop, or loop 504, represented by loop 522. Thus, the order of the loop 502 and the loop 504 is interchanged. After loop interchange, the k loop or loop 522 still iterates 5 times, as illustrated by block 528-532. The j loop or loop 524 iterates loop 522 10 times, as illustrated by block 526. The processor may now access elements that are in memory locations closer to each other, rather than having to fetch elements from sparse memory locations.

By using loop interchange, the access pattern of data from memory is changed while maintaining the same distribution of data in memory. In this way, spatial locality is improved by rearranging the order in which loops execute rather than rearranging data. As a result, cache misses may be reduced.

Figure 6:
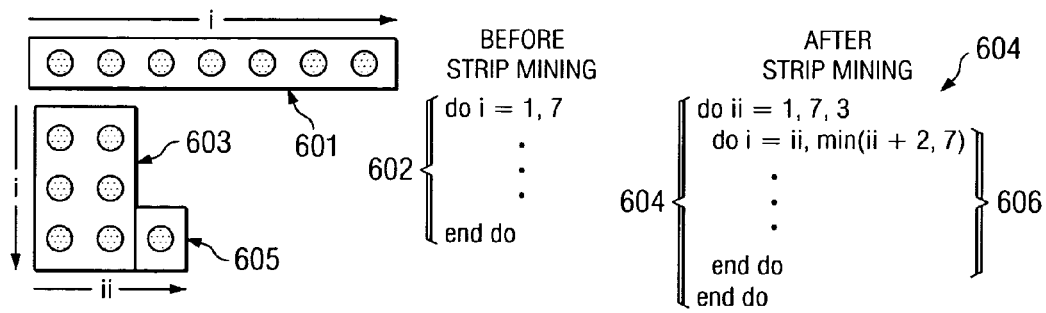
FIG. 6 is a diagram illustrating the concept of strip mining in accordance with a preferred embodiment of the present invention.

Turning now to FIG. 6, a diagram illustrating the concept of strip mining is depicted in accordance with a preferred embodiment of the present invention. As shown in FIG. 6, in this illustrative example, loop 602 iterates i from 1 to 7, as illustrated by block 601.

With strip mining, loop 602 is divided into two loops, loop 604 and 606.

Loop 604 is similar to loop 602, which iterates from 1 to 7, but with a new index, ii, assigned. In addition, a step size of 3 is added to the loop. The original, loop 602, is modified to loop 606. This loop iterates the original index i from ii to minimum of (ii+2, 7). By using these two loops, loop 602 is strip mined into two chunks of three elements and a single element, as illustrated by blocks 603 and 605. Strip mining therefore fragments a large iteration space into smaller segments.

Figures 7, 8:
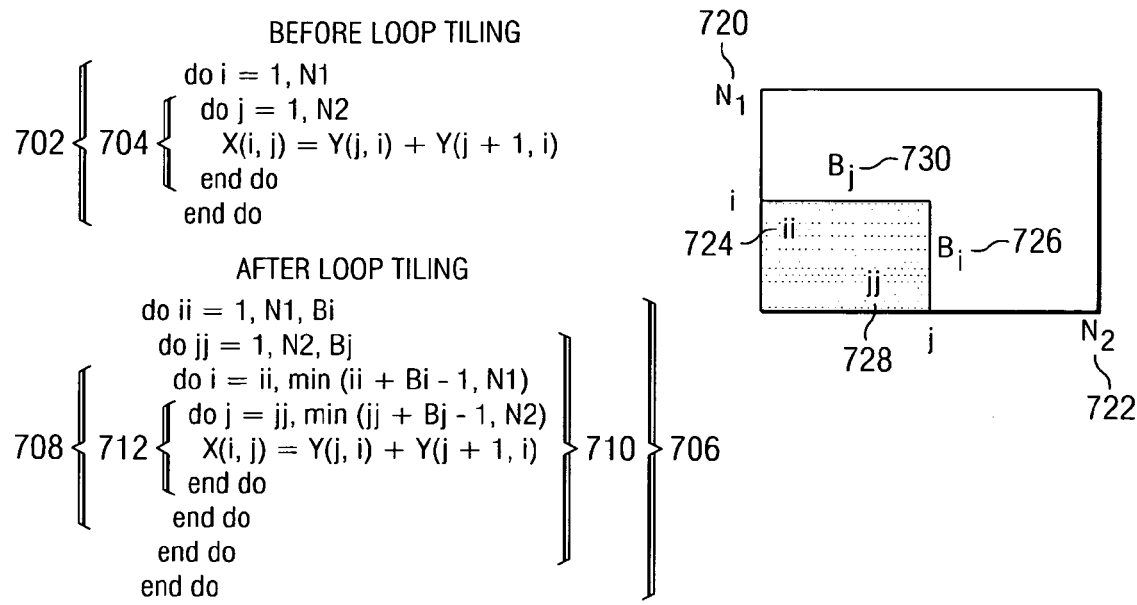
FIG. 7 is a diagram illustrating the concept of loop tiling in accordance with a preferred embodiment of the present invention.
FIG. 8 is a diagram illustrating an exemplary implementation of BLOCK_LOOP directive for the purpose of strip mining in accordance with a preferred embodiment of the present invention.

Turning now to FIG. 7, a diagram illustrating the concept of loop tiling is depicted in accordance with a preferred embodiment of the present invention. As shown in FIG. 7, in this illustrative example, loop tiling or loop blocking combines the techniques of loop interchange and strip mining. Loop tiling is similar to strip mining in two or more dimensions, with interchange applied to the blocking loops.

The main purpose of loop tiling or blocking is to eliminate as many cache misses as possible by transforming memory domain into smaller chucks, rather than sequentially traversing through the entire memory domain. Each chuck of memory should be small enough to fit all the data for a given computation into the cache, thereby maximizing data reuse. Thus, loop tiling combines strip mining and loop interchange to form small tiles of loop iterations in order to increase spatial locality.

In this illustrative example, before loop tiling is performed, loop 702 iterates i from 1 to N1 720, which is an upper bound of the i loop. Loop 704 iterates j from 1 to N2 722, which is an upper bound of the j loop. After loop tiling is performed, blocking loop 706 is created for loop 702 and loop 702 is modified to become loop 708. Loop 706 is the same as loop 702, which iterates from 1 to N1 720, except with an index ii 724 and a step size of Bi 726. Similarly, after loop tiling is performed, blocking loop 710 is created for loop 704 and loop 704 is modified to loop 712. Loop 710 is the same as loop 704, which iterates from 1 to N2 722, except with an index jj 728 and a step size of Bj 730.

Bi 726 and Bj 730 are blocking factors, which define the bound of the iteration space or the size of a tile. Index ii and jj are added to subdivide the ranges of index i and j into smaller ranges to iterate elements within the tile, in this example, shaded tile Bi 726×Bj 730. As shown in FIG. 7, loop 708 iterates from index ii to minimum of (ii+N1−1) and Bi. Similarly, loop 712 iterates from index jj to minimum of (jj+N2−1) and Bj. The minimum equation is used for correctness, such that even if the upper bounds N1 or N2 do not evenly divide by Bi or Bj, the loops will iterate to the upper bounds. Loops 708 and 712 only iterate within tiles of the iteration space, while loops 706 and 710 iterate within the entire iteration space.

By using loop tiling or blocking, spatial locality is improved and cache line may be reused. In this example, since Y accesses data across columns j and j+1, cache line loaded for j+1 may be reused within the tile for the next iteration as j. In addition, by tiling j and i, we can fine tune the generated code such that cache lines loaded for Y(j,i) and Y(j+1,i) can be used for the next iteration of i to access Y(j,i+1) and Y(j+1,i+1). For sufficiently large values of N2, this can have a large impact on improving the performance of the program.

Turning now to FIG. 8, a diagram illustrating an exemplary implementation of BLOCK_LOOP directive for the purpose of strip mining is depicted in accordance with a preferred embodiment of the present invention. As shown in FIG. 8, in this illustrative example, BLOCK_LOOP directive 806 is inserted by a user into source code, such as source code 400 in FIG. 4. BLOCK_LOOP directive 806 may be inserted by using common directives, such as #pragma directives in C and C++, or user directives in Fortran. Other types of directives also may be used.

In this example, BLOCK_LOOP directive 806 includes only one parameter, which is the blocking factor or tile size of 50. Since no second or subsequent parameters are defined, BLOCK_LOOP directive 806 directs the compiler to block the loop immediately following BLOCK_LOOP directive 806, in this case, the j loop or loop 804. In this example, loop 802 iterates i from 1 to N and loop 804 iterates j from 1 to M. N and M are the limits of loop 802 and loop 804, respectively.

Once the source code is compiled by the compiler, resulting code generated by the compiler is illustrated by loops

812 and 814. In this example, the i loop or loop 802 remains, but the j loop or loop 804 is strip mined by a factor of 50, which means the iteration space of loop 804 is divided into blocks, or strips, of length at most 50. The compiler creates an outer loop 812 by first adding an index jj and setting index jj to the initial value of j in loop 804, which is 1. The compiler then assigns loop 812 to iterate from 1 to M with a step size of 50.

Next, the compiler modifies original loop 804 with loop 814, which sets index j to jj and iterates from jj to minimum of (jj+step size−1) and M. Thus, using the BLOCK_LOOP directive of the present invention, strip mining of a loop may be performed by specifying the tile size in the first parameter, which defines the factor by which the iteration space would be divided.

Figure 9:
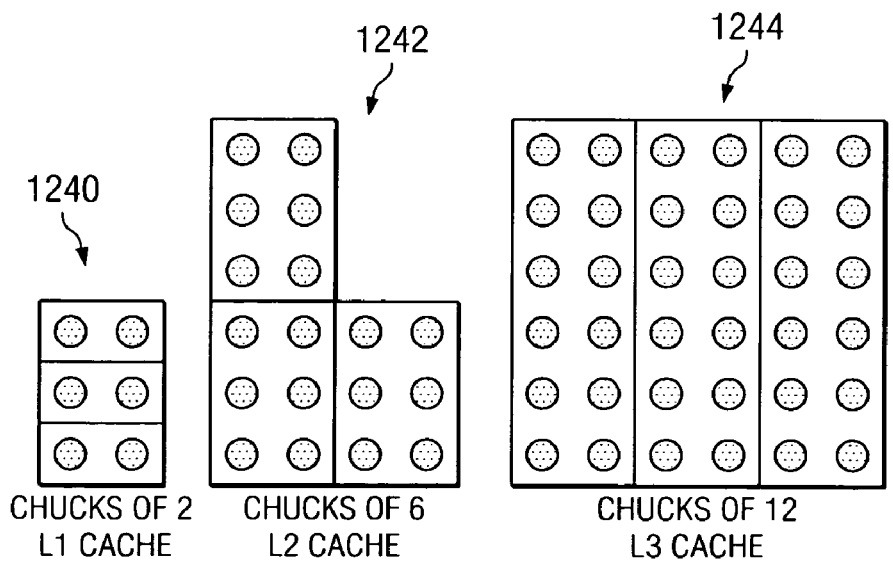
FIG. 9 is a diagram illustrating an exemplary implementation of BLOCK_LOOP and LOOPID directives for the purpose of loop tiling using machine's actual cache size in accordance with a preferred embodiment of the present invention.

Turning now to FIG. 9, a diagram illustrating an exemplary implementation of BLOCK_LOOP and LOOPID directive for the purpose of loop tiling using machine's actual cache size is depicted in accordance with a preferred embodiment of the present invention. As shown in FIG. 9, in this illustrative example, BLOCK_LOOP directive 904 is inserted by a user in front of loop 902. BLOCK_LOOP directive 904 is different from BLOCK_LOOP directive 806 in FIG. 8 in that BLOCK_LOOP directive 904 includes two parameters: compute_tile_size 905 and myloop 906.

Compute_tile_size 905 is a user-defined function that is invoked when BLOCK_LOOP directive 904 is processed by the compiler. When compute_tile_size 905 is invoked with an input parameter of M, the tile size of the machine currently running the generated code is computed at run-time based on a limit M. Thus, loop tiling based on the actual machine's cache size could be achieved using BLOCK_LOOP directive 904.

Myloop 906 is an identifier given by a user to identify a loop that is to be blocked by the compiler. LOOPID directive 908 gives a user control of marking any loop in a loop nest in order to perform loop transformations. LOOPID directive 908 marks either the loop immediately following the directive or a BLOCK_LOOP directive if defined by the user.

Unlike the previous example in FIG. 8, which blocks the loop immediately following BLOCK_LOOP directive 904, myloop 906 parameter directs the compiler to search for a loop with an identifier of myloop 906. When the source code is processed by the compiler, the compiler first scans the source code and registers the nesting levels of each loop. Once the nesting levels are registered, the compiler sorts the order of the nesting levels from the highest to the lowest. Thus, the inner most loop, which has a highest nesting levels, is processed first.

In this example, the j loop or loop 907 is the inner most loop. The compiler thus processes LOOPID directive 908 associated with loop 907 and registers the identifier "myloop" with loop 907. Next, the compiler processes BLOCK_LOOP directive 904, which blocks a loop with an identifier of myloop 906 with a blocking factor computed at run-time by the function compute_tile_size 905. Since the compiler registered loop 907 previously with an identifier of "myloop", the compiler recognizes loop 907 as the loop to be blocked. The loop to be blocked has to be nested within the blocking loop.

The compiler processes BLOCK_LOOP directive 904 by creating loop 910 as an outer loop to divide the iteration space into size of the tile computed at run-time by compute_tile_size 905. Loop 910 iterates from 1 to M with a step size of the result of compute_tile_size 905 with an input limit of M. Thus, Loop 910 divides M into smaller chucks that fit in the cache. Loop 902 remains the same since it was not blocked by BLOCK_LOOP directive 904. The compiler then modifies original loop 907 to become loop 914, which assigns index j to jj and iterates j from jj to minimum of (jj+result of compute_tile_size 904 with an input limit M−1) and M.

Loops 910 and 914 allow users to tune program instructions to a specific memory hierarchy by dividing the limit of M into many different sizes of caches. This tuning improves performance on the machine overall by reusing the smaller chucks of cache memory and fitting the smaller chucks of memory, such as L2 cache, into larger chunks of cache memory, such as L3 cache. In addition, BLOCK_LOOP directive 904 and LOOPID directive 908 also enable a better interaction between programmers and the compiler.

Figure 10:
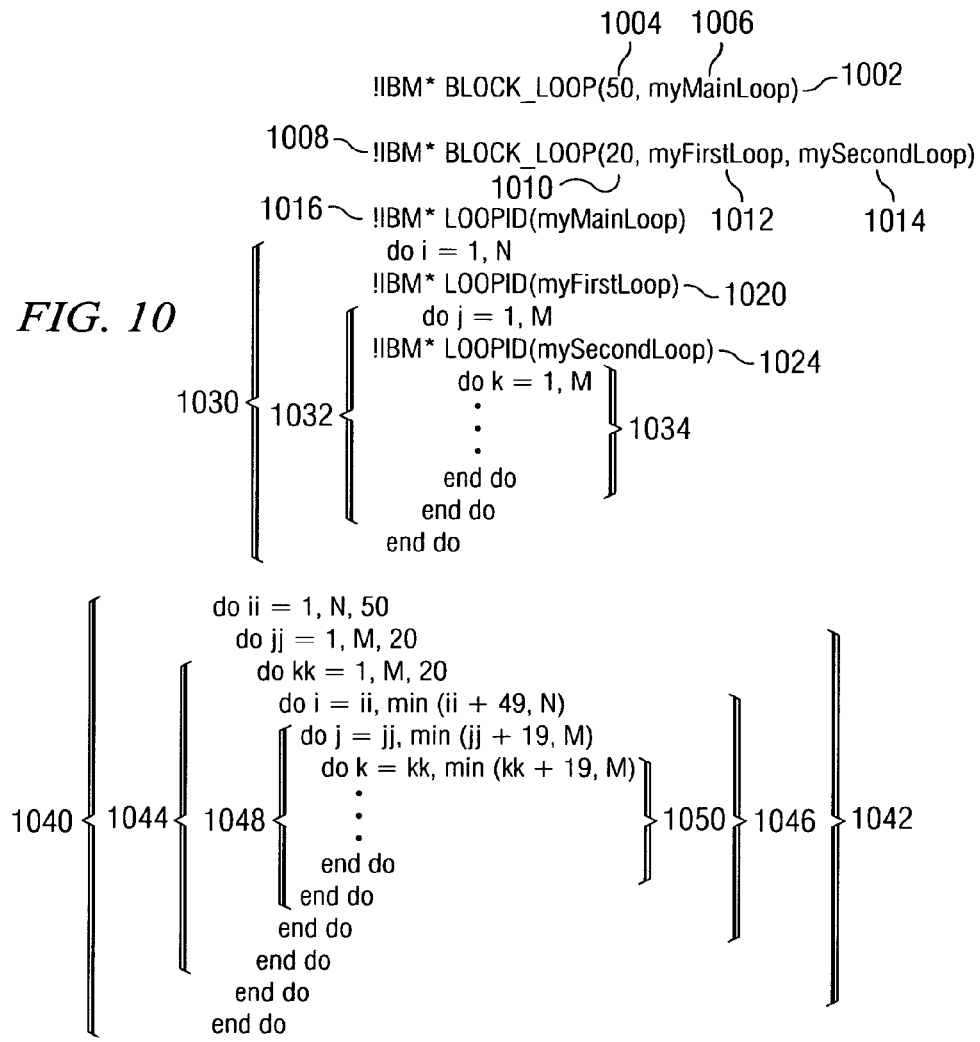
FIG. 10 is a diagram illustrating an exemplary implementation of BLOCK_LOOP and LOOPID directives for the purpose of loop tiling with multiple loop identifiers in accordance with a preferred embodiment of the present invention.

Turning now to FIG. 10, a diagram illustrating an exemplary implementation of BLOCK_LOOP and LOOPID directive for the purpose of loop tiling with multiple loop identifiers is depicted in accordance with a preferred embodiment of the present invention. As shown in FIG. 10, in this illustrative example, a user placed two BLOCK_LOOP directives in the source code: BLOCK_LOOP directive 1002 and BLOCK_LOOP directive 1008. BLOCK_LOOP directive 1002 includes two parameters: a blocking factor 1004 of 50 and myMainLoop 1006. Thus, BLOCK_LOOP directive 1002 directs the compiler to block myMainLoop 1006 with a blocking factor 1004 of 50. BLOCK_LOOP directive 1008 includes three parameters: a blocking factor 1010 of 20, myFirstLoop 1012 and mySecondLoop 1014. Thus, BLOCK_LOOP directive 1008 directs the compiler to block myFirstLoop 1012 and mySecondLoop 1014 with a blocking factor 1010 of 20.

The user also defines three loop identifiers in the source code: myMainLoop 1016, myFirstLoop 1020 and mySecondLoop 1024. MyMainLoop 1016 marks the loop immediately after the directive, in this example, the i loop or loop 1030. Similarly, myFirstLoop 1020 marks the j loop or loop 1032 and mySecondLoop 1024 marks the k loop or loop 1034. Thus, the user aimed to block three different loops within a loop nest registered with three different loop identifiers.

As described above, loops 1030-1034 are registered with the compiler when the compiler scans the source code. Therefore, compiler recognizes loops 1030-1034 with loop identifiers myMainLoop 1016, myFirstLoop 1020, and mySecondLoop 1024, respectively.

The compiler then processes BLOCK_LOOP directives 1002 and 1008 by creating outer loops 1040, 1042, and 1044 to block loops 1030, 1032, and 1034. Loops 1040-44 are processed by the compiler in the order of appearance in BLOCK_LOOP directives 1002 and 1008. Thus, loop 1040 is generated first, then loop 1042 and loop 1044. As shown in FIG. 10, loop 1040 is a generated blocking loop that iterates from ii to N with a step size of 50. N is the limit of loop 1040. Loop 1042 is a generated blocking loop that iterates from 1 to M with a step size of 20. Loop 1044 is a generated blocking loop that iterates from 1 to M with a step size of 20. M is the limit for loop 1042 and 1044.

Once loops 1040-44 are generated, the compiler modifies loops 1030-1034 to become loops 1046-1050. Loop 1046 is a blocked loop that iterates i from ii to minimum of (ii+50−1) and N. Loop 1048 is a blocked loop that iterates j from jj to minimum of (jj+20−1) and M. Loop 1050 is a blocked loop that iterates k from kk to minimum of (kk+20−1) and M.

By using BLOCK_LOOP and LOOPID directives, the present invention allows users to control transformations of different loops in a loop nest by applying different blocking factors or tile sizes to different loops. Thus, the present invention has advantages over the prior art in that by using the BLOCK_LOOP and LOOPID directives, a user may refer to multiple loops in different locations at the same time, without modifying underlying program instructions. This gives flexibility to the user to combine any loops to perform techniques such as loop tiling or strip mining.

Figure 11:
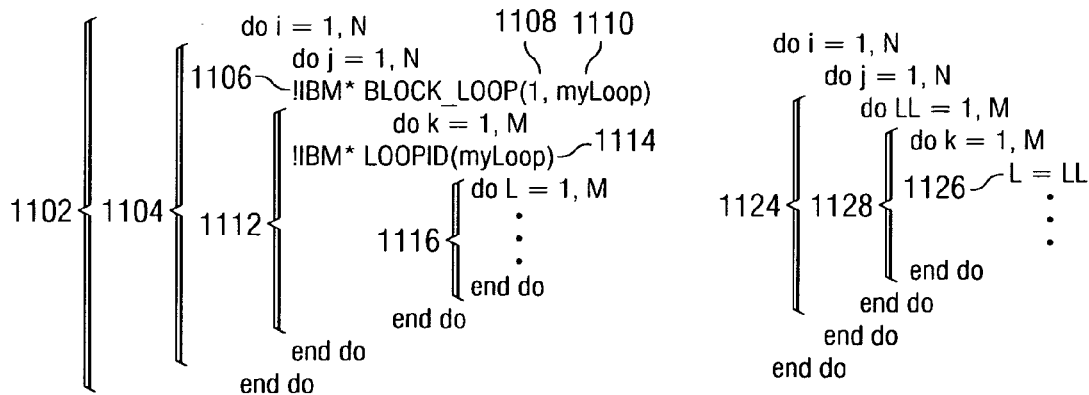
FIG. 11 is a diagram illustrating an exemplary implementation of BLOCK_LOOP and LOOPID directives for the purpose of loop interchange in accordance with a preferred embodiment of the present invention.

Turning now to FIG. 11, a diagram illustrating an exemplary implementation of BLOCK_LOOP and LOOPID directive for the purpose of loop interchange is depicted in accordance with a preferred embodiment of the present invention. As shown in FIG. 11, in this illustrative example, a user placed BLOCK_LOOP directive 1106 after loop 1102 and loop 1104 in order to block the k loop or loop 1112. BLOCK_LOOP directive 1106 includes two parameters: a blocking factor 1108 of 1 and a loop identifier of myLoop 1110. MyLoop 1110 is specified by the user with LOOPID directive 1114, which marks the L loop, loop 1116.

By specifying a blocking factor 1108 of 1, a user may cause the loop being blocked, in this case, L loop or loop 1116, to become a single iteration loop. In addition, the user will cause the generated blocking loop to make all the iterations of the original loop. As shown in FIG. 11, the k loop or loop 1112 currently wraps the L loop or loop 1116. After the compiler processed BLOCK_LOOP directive 1106 and LOOPID directive 1114, the compiler generates loops 1124 and statement 1126. Loop 1124 is generated as an outer blocking loop that blocks the L loop, loop 1116, which iterates LL from 1 to M. M is the limit of loop 1116. In this way, loop 1124 makes all the iterations of the original loop, loop 1116.

In addition, the compiler modifies original loop 1116 to become statement 1126, which sets index L to LL. Unlike previous examples, blocking factor 1108 specified in BLOCK_LOOP directive 1106 is 1. As a result, statement 1126 is a single iteration loop that only gets executed once. The L loop or loop 1124 now wraps the k loop or loop 1128. Thus, specifying a blocking factor 1108 of 1 allows a user to perform loop interchange on two loops, which switches the order of access to which the elements are stored in memory.

Using a blocking factor of 1 with BLOCK_LOOP directive of the present invention, a user may direct the compiler to perform loop interchange or to create a different permutation of the loop nest. As mentioned previously, loop interchange changes the access pattern of elements in the loops to the order stored in memory, which improves spatial locality by rearranging access to memory locations that are closer to the processor. For example, in a 2-dimensional matrix, instead of accessing elements from each row, which forces the processor to access memory locations that are sparse, loop interchange may be performed to access elements that are closer to each other.

Turning now to FIG. 12A, a diagram illustrating an exemplary implementation of BLOCK_LOOP and LOOPID directive for the purpose of loop tiling for multi-level memory hierarchy is depicted in accordance with a preferred embodiment of the present invention. As shown in FIG. 12A, in this illustrative example, a user placed BLOCK_LOOP directive 1202 in front of the i loop, loop 1204. BLOCK_LOOP directive 1202 includes two parameters: a blocking factor of L3Factor 1204 and an identifier of first_level_blocking 1205, which is the blocked loop. L3Factor 1204 may represent a level 3 cache memory in a system.

Blocked loop first_level_blocking 1205 is defined by the user using LOOPID directive 1206. In this case, instead of a loop immediately following the directive, BLOCK_LOOP directive 1208 immediately follows. BLOCK_LOOP directive 1208 is placed in front of j loop or loop 1210. BLOCK_LOOP directive 1208 includes two parameters: a blocking factor of L2Factor 1218 and an identifier of inner_space 1220, which is the blocked loop. L2Factor 1218 may represent the size of a level 2 cache memory in the system.

Blocked loop inner_space 1220 is defined by the user with LOOPID directive 1212, with the k loop or loop 1214 immediately following the directive. Therefore, in this example, inner_space 1212 is blocked with with L2Factor 1218. The result, represented by first_level_blocking 1206, is in turn blocked with L3Factor 1204.

When the compiler scans the source code, the compiler first registers the nesting level of each loop. In this case, loop 1204 is registered with a nesting level of 0. Loop 1210 is registered with a nesting level of 1. Loop 1214 is registered with a nesting level of 2. Loop 1216 is registered with a nesting level of 3. Then, the compiler sorts the order of the loops from the highest nesting level to the lowest nesting level. Thus, loop 1216 is processed first, then followed by loop 1214, 1210 and 1204.

When the compiler processes the k loop or loop 1214, the compiler processes LOOPID directive 1212, which marks the k loop or loop 1214 and registers loop 1214 with an identifier of "inner_space". Then, the compiler processes loop 1210 and BLOCK_LOOP directive 1208, which is discussed in further detail in FIG. 12B.

Turning now to FIG. 12B, a diagram illustrating exemplary resulting code after BLOCK_LOOP directive 1208 in FIG. 12A is processed by the compiler is depicted in accordance with a preferred embodiment of the present invention. As shown in FIG. 12B, in this illustrative example, the compiler processes BLOCK_LOOP directive 1208 in FIG. 12A, which blocks a loop with an identifier of "inner_space" with a blocking factor of "L2Factor".

When the compiler processes BLOCK_LOOP directive 1208 in FIG. 12A, the compiler first creates loop 1218 as an outer blocking loop that blocks loop 1214 in FIG. 12A. Loop 1214 is recognized by the compiler, since it is previously registered with an identifier of "inner_space". Loop 1218 iterates index kk from 1 to M with a step size of L2Factor, which is the blocking factor specified in BLOCK_LOOP directive 1208 in FIG. 12A. The compiler then modifies loop 1214 in FIG. 12A to become loop 1219, which iterates original index k from kk to minimum of (kk+L2Factor−1) and M, with a step size of 1.

In this example, the newly created kk loop or loop 1218 also has a nesting level of 1, since it is within the i loop or loop 1204. Therefore, the compiler continues to process LOOPID directive 1206 that marks the kk loop or loop 1218 and registers loop 1218 with an identifier of "first_level_blocking". Once loop 1218 is registered, the i loop or loop 1204 and BLOCK_LOOP directive 1202 is processed by the compiler, which is discussed in further detail in FIG. 12C.

Turning now to FIG. 12C, a diagram illustrating exemplary resulting code after BLOCK_LOOP directive 1202 in FIG. 12B is processed by the compiler is depicted in accordance with a preferred embodiment of the present invention. As shown in FIG. 12C, in this illustrative example, the compiler processes BLOCK_LOOP directive 1202 in FIG. 12B, which blocks a loop with an identifier of "first_level_blocking" with a blocking factor of L3Factor.

When the compiler processes BLOCK_LOOP directive 1202 in FIG. 12B, the compiler first creates loop 1220 as an outer blocking loop that blocks loop 1218 in FIG. 12B. Loop 1218 is recognized by the compiler, since it is previously registered with an identifier of "first_level_blocking". Loop 1220 iterates index kkk from 1 to M, with a step size of L3Factor, which is the blocking factor specified in BLOCK_LOOP directive 1202 in FIG. 12B, multiplied by L2Factor. The blocking factor, L3fFactor, is multiplied by the previous blocking factor, L2Factor, such that we can further divide the iteration space into blocks of L2Factor×L3Factor.

Loop 1219 remains the same. However, the compiler modifies loop 1218 in FIG. 12B to become loop 1224, which iterates original index kk from kkk to minimum of (kk+L3Factor×L2Factor−1) and M, with the same step size of L2Factor.

Thus, the BLOCK_LOOP and LOOPID directives of the present invention may be used to perform loop tiling for multi-level memory hierarchy. In the example illustrated in FIGS. 12A-C, instead of having to access memory space from main memory, chunks of level 1 cache memories may be reused to form a larger chunk of level 2 cache memory. In turn, chunks of level 2 cache memories may be reused to form a larger chunk of level 3 cache memory and so on. This enhances reuse of cache memories and reduces cache miss rates. In addition, the directives also give user control of loop transformations, such as loop interchange and loop tiling, at each level of the memory hierarchy.

Turning now to FIG. 13, a diagram illustrating concept of fitting lower level cache memory into higher level cache memory is depicted in accordance with a preferred embodiment of the present invention. As depicted in FIG. 13, L1 cache 1240 is represented by two elements or chunks of 2. The chunks of 2 of L1 caches may then be reused to form a L2 cache 1242, which includes a chuck of 6 elements or 3 chunks of L1 caches 1240. In turn, the chunks of 6 of L2 caches 1242 may then be fitted or reused to form a L3 cache 1244, which includes a chunk of 12 elements or 2 chunks of L2 caches 1242.

In summary, the present invention provides a generic language interface, which includes two new directives, to apply loop optimization transformations. The directives convey two pieces of information that relate to two different loops in a loop nest at the same time: a location where the blocking loop may be created and a loop to be blocked at any level of a given loop nest.

The directives also provide better interactions between the program instructions and the compiler as well as flexibility of performing loop transformation on any given loop in a loop nest. Furthermore, a user or programmer may perform tuning of program instructions to improve performance by first directing the compiler to ignore the directives and observe the result of the loop executions with correctness in mind. Later on, the programmer may apply the directives to speed up loop executions and record the performance gained by using the directives. Iteratively, the programmer may use the performance records to tune program instructions.

Moreover, a user may utilize the directives of the present invention to perform loop tiling for multi-level memory hierarchy without modifying the program instructions, such that the memory space may be divided into smaller chunks that can be reused.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for applying loop optimization transformations, the method comprising:
   detecting at least one loop identifier directive in a computer program, and in response thereto, marking a loop in the computer program to form a marked loop;
   detecting at least one block loop directive in the computer program, wherein the block loop directive includes a blocking factor parameter and at least one blocked loop identifier parameter that identifies the marked loop;
   generating at least one loop transformation based on the at least one block loop directive; and
   applying the at least one loop transformation in the computer program to generate machine language instructions for the computer program, wherein the machine language instructions are located on a storage device of the data processing system.

2. The method of claim 1, wherein the blocking factor parameter is an executable function that is invoked when the block loop directive is processed by a compiler.

3. The method of claim 1, wherein the generating step comprises:
   generating a blocking loop for the marked loop; and
   modifying the marked loop to form a blocked loop.

4. The method of claim 3, wherein the block loop directive includes at least two blocked loop identifier parameters that identify a plurality of different loops in the computer program.

5. The method of claim 4, wherein the marked loop is a loop immediately following the loop identifier directive or a block loop directive.

6. The method of claim 3, wherein the data processing system comprises a cache memory hierarchy comprising a first level cache having a first cache size, a second level cache having a second cache size and a third level cache having a third cache size, and wherein the blocking loop surrounds the marked loop, and further comprising:
   generating a second blocking loop that surrounds the blocking look, wherein the blocking loop has a blocking factor that is based one of the first cache size, second cache size and third cache size, and the second blocking loop has a second blocking factor that is based another of the first cache size, second cache size and third cache size.

7. The method of claim 1, wherein the loop identifier directive includes at least a loop identifier parameter.

8. The method of claim 7, wherein the loop identifier parameter identifies a loop immediately following the loop identifier directive.

9. The method of claim 7, wherein the loop identifier parameter identifies a loop immediately following the block loop directive.

10. The method of claim 3, wherein the step of generating a blocking loop for the marked loop includes:
creating a new index and initializing the new index to an initialization value of an original index of the marked loop;
retrieving a blocking factor from the blocking factor parameter;
retrieving a limit from the marked loop; and
generating the blocking loop using the new index, the blocking factor and the limit, wherein the blocking loop surrounds the marked loop.

11. The method of claim 10, wherein the blocking loop iterates the new index from the initialization value of original index of the marked loop to the limit with a step size of the blocking factor times original step size of the marked loop, wherein the original step size of the marked loop is greater than one (1).

12. The method of claim 10, wherein the step of modifying the marked loop to form a blocked loop includes:
assigning the initialization value of the original index to the new index;
retrieving a blocking factor from the blocking factor parameter;
retrieving the limit from the limit;
generating an expression using the new index, the blocking factor, and the limit; and
generating the blocked loop using the expression and the original index.

13. The method of claim 12, wherein the expression is a minimum of an evaluated expression and the limit.

14. The method of claim 13, wherein the evaluated expression includes:
adding the new index to the blocking factor times a step size of the blocked loop to form a result; and
subtracting one from the result.

15. The method of claim 12, wherein the blocked loop iterates the original index from the new index to a value computed using the expression.

16. The method of claim 3, wherein the step of applying the at least one loop transformation in the computer program includes:
placing the blocking loop outside of the marked loop in the computer program; and
replacing the marked loop with the blocked loop.

17. A data processing system for applying loop optimization transformations, the data processing system comprising:
first detecting means for detecting at least one loop identifier directive in a computer program, and in response thereto, marking a loop in the computer program to form a marked loop;
second detecting means for detecting at least one block loop directive in the computer program, wherein the block loop directive includes a blocking factor parameter and at least one blocked loop identifier parameter that identifies the marked loop;
generating means for generating at least one loop transformation based on the at least one block loop directive; and
applying means for applying the at least one loop transformation in the computer program to generate machine language instructions for the computer program, wherein the machine language instructions are located on a storage device of the data processing system.

18. The data processing system of claim 17, wherein the blocking factor parameter is an executable function that is invoked when the block loop directive is processed by a compiler.

19. The data processing system of claim 17, wherein the generating means for generating at least one loop transformation comprises:
generating means for generating a blocking loop for the marked loop; and
modifying means for modifying the marked loop to form a blocked loop.

20. The data processing system of claim 19, wherein the block loop directive includes at least two blocked loop identifier parameters that identify a plurality of different loops in the computer program.

21. The data processing system of claim 20, wherein the data processing system comprises a cache memory hierarchy comprising a first level cache having a first cache size, a second level cache having a second cache size and a third level cache having a third cache size, and wherein the blocking loop surrounds the marked loop, and further comprising:
generating a second blocking loop that surrounds the blocking look, wherein the blocking loop has a blocking factor that is based one of the first cache size, second cache size and third cache size, and the second blocking loop has a second blocking factor that is based another of the first cache size, second cache size and third cache size.

22. The data processing system of claim 19, wherein the generating means includes:
creating means for creating a new index;
initializing means for initializing the new index to an initialization value of an original index of the marked loop;
retrieving means for retrieving a blocking factor from the blocking factor parameter;
retrieving means for retrieving a limit from the marked loop; and
generating means for generating the blocking loop using the new index, the blocking factor and the limit, wherein the blocking loop surrounds the marked loop.

23. The data processing system of claim 22, wherein the modifying means includes:
assigning means for assigning the initialization value of the original index to the new index;
retrieving means for retrieving a blocking factor from the blocking factor parameter;
retrieving means for retrieving the limit from the limit;
generating means for generating an expression using the new index, the blocking factor, and the limit; and
generating means for generating the blocked loop using the expression and the original index.

24. The data processing system of claim 19, wherein the applying means includes:
placing means for placing the blocking loop outside of the marked loop in the computer program; and
replacing means for replacing the marked loop with the blocked loop.

25. A computer program product encoded in a computer storage medium and operable in a data processing system for applying loop optimization transformations, the computer program product comprising:

first instructions for detecting at least one loop identifier directive in another computer program, and in response thereto, marking a loop in the computer program to form a marked loop;

second instructions for detecting at least one block loop directive in the another computer program, wherein the block loop directive includes a blocking factor parameter and at least one blocked loop identifier parameter that identifies the marked loop;

third instructions for applying at least one loop transformation based on the at least one block loop directive to at least one loop in the another computer program to generate machine language instructions for the another computer program.

26. The computer program product of claim 25, wherein the blocking factor parameter is an executable function that is invoked when the block loop directive is processed by a compiler.

27. The computer program product of claim 25, further comprising:

first sub-instructions for generating a blocking loop for the marked loop; and second sub-instructions for modifying the marked loop to form a blocked loop.

28. The computer program product of claim 27, wherein the block loop directive includes at least two blocked loop identifier parameters that identify a plurality of different loops in the another computer program.

29. The computer program product of claim 27, wherein the data processing system comprises a cache memory hierarchy comprising a first level cache having a first cache size, a second level cache having a second cache size and a third level cache having a third cache size, and wherein the blocking loop surrounds the marked loop, and further comprising:

third sub-instructions for generating a second blocking loop that surrounds the blocking look, wherein the blocking loop has a blocking factor that is based on one of the first cache size, second cache size and third cache size, and the second blocking loop has a second blocking factor that is based on a different one of the first cache size, second cache size and third cache size.

30. The computer program product of claim 27, wherein the first sub-instructions includes:

first instructions for creating a new index and initializing the new index to an initialization value of an original index of the marked loop;

second instructions for retrieving a blocking factor from the blocking factor parameter;

third instructions for retrieving a limit from the marked loop; and fourth instructions for generating the blocking loop using the new index, the blocking factor and the limit, wherein the blocking loop surrounds the marked loop.

31. The computer program product of claim 30, wherein the second sub-instructions includes:

first instructions for assigning the initialization value of the original index to the new index;

second instructions for retrieving a blocking factor from the blocking factor parameter;

third instructions for retrieving the limit from the limit;

fourth instructions for generating an expression using the new index, the blocking factor, and the limit; and fifth instructions for generating the blocked loop using the expression and the original index.

* * * * *